(12) United States Patent
Yang et al.

(10) Patent No.: US 10,644,357 B2
(45) Date of Patent: May 5, 2020

(54) LITHIUM ION BATTERY STACKING DEVICE

(71) Applicant: Tsinghua University, Beijing (CN)

(72) Inventors: Yong Yang, Suzhou (CN); Xiang-Ming He, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 192 days.

(21) Appl. No.: 15/871,110

(22) Filed: Jan. 15, 2018

(65) Prior Publication Data

US 2018/0138553 A1 May 17, 2018

Related U.S. Application Data

(63) Continuation of application No. PCT/CN2016/090257, filed on Jul. 18, 2016.

(30) Foreign Application Priority Data

Jul. 24, 2015 (CN) .......................... 2015 1 0442394

(51) Int. Cl.
| | | |
|---|---|---|
| *H01M 10/0585* | (2010.01) | |
| *H01M 10/0583* | (2010.01) | |
| *H01M 10/0525* | (2010.01) | |
| *H01M 10/42* | (2006.01) | |

(52) U.S. Cl.
CPC ... *H01M 10/0585* (2013.01); *H01M 10/0525* (2013.01); *H01M 10/0583* (2013.01); *H01M 10/4207* (2013.01)

(58) Field of Classification Search
CPC .................................................. H01M 10/0583
See application file for complete search history.

(56) References Cited

U.S. PATENT DOCUMENTS

| | | | | |
|---|---|---|---|---|
| 2014/0237808 A1* | 8/2014 | Nakakuki | ......... | H01M 10/0404 29/623.1 |
| 2014/0374947 A1* | 12/2014 | Ichinomiya | .......... | B29D 99/005 264/175 |

FOREIGN PATENT DOCUMENTS

| | | |
|---|---|---|
| CN | 102751538 A | 10/2012 |
| KR | 20120078824 | 7/2012 |

OTHER PUBLICATIONS

International Search Report of PCT/CN2016/090257.

* cited by examiner

*Primary Examiner* — Ladan Mohaddes

(57) ABSTRACT

A lithium ion battery stacking device comprising a separator releasing mechanism, a stacking mechanism, and a collecting mechanism is provided. The separator releasing mechanism is configured to be loaded with a separator and release the separator. The stacking mechanism is configured to attach a cathode plate and an anode plate to the separator. The collecting mechanism is configured to stack the separator attached with the cathode plate and the anode plate. The separator releasing mechanism, the stacking mechanism, and the collecting mechanism are configured to keep the separator perpendicular to a horizontal plane.

12 Claims, 6 Drawing Sheets

LITHIUM ION BATTERY STACKING DEVICE

CROSS-REFERENCE TO RELATED APPLICATIONS

This application claims all benefits accruing under 35 U.S.C. § 119 from China Patent Application No. 201510442394.0, filed on Jul. 24, 2015 in the State Intellectual Property Office of China, the content of which is hereby incorporated by reference. This application is a continuation under 35 U.S.C. § 120 of international patent application PCT/CN2016/090257 filed on Jul. 18, 2016, the content of which is also hereby incorporated by reference.

FIELD

The present disclosure relates to lithium ion battery stacking devices, especially to stacking devices and stacking methods using a vertical "Z" shaped stacking manner.

BACKGROUND

A high power lithium ion battery is a current developing direction. A conventional high power lithium ion battery is manufactured by insulating a cathode plate and an anode plate by a separator, and alternately stacking the separator and the electrode plates repeatedly to form ten to hundred pairs.

In a conventional lithium ion battery stacking device, when a manipulator hand moves from one side to another, electrode plates are sucked by the manipulator hand from a cathode plate box and an anode plate box, and alternately placed on a stacking platform. Meanwhile, the separator is moved with a sucking disc frame and is folded repeatedly, by which the electrode plates and the separator are stacked and assembled to form a complete cell. The conventional stacking method of the lithium ion battery uses three-station type stacking manner, whose stacking route is through electrode plates picking up, positioning, and stacking.

However, in the conventional lithium ion battery stacking device, more than one plates may be picked in one picking step. Moreover, the dust adsorbed on the cathode plate and the anode plate is difficult to be cleaned, thereby affecting the performance of the lithium ion battery.

SUMMARY

A lithium ion battery stacking device is provided.

The lithium ion battery stacking device comprises a separator releasing mechanism, a stacking mechanism, and a collecting mechanism, which are disposed in sequence. The separator releasing mechanism is configured to be loaded with a separator and release the separator. The stacking mechanism is configured to attach a cathode plate and an anode plate to the separator. The collecting mechanism is configured to stack the separator attached with the cathode plate and the anode plate to form the lithium ion battery. The surface of the separator is perpendicular to a horizontal plane and is successively released from the separator releasing mechanism, attached with the cathode plate and the anode plate in the stacking mechanism, and the plates are stacked in the collecting mechanism. The stacking mechanism can comprise a double-face clamp to clamp the cathode plate and the anode plate on the separator, rotate the cathode plate and the anode plate attached on the separator, and transport the cathode plate and the anode plate attached on the separator to the collecting mechanism.

In the present disclosure, the stacking direction is changed, and the electrode plates and the separator are stacked in a direction perpendicular to the horizontal plane, thereby removing the dust effectively and decreasing the chance of stacking multiple cathode plates or multiple anode plates in one stack. By having the positioning platform, stacking the electrode plates and the separator vertically in a "Z" shaped curve manner, providing the electrode plates in vertical manner, and using the double-face clamp circularly, the dust adsorbed on the surfaces of the electrode plates are easily removed, the work efficiency is increased, and product quality is enhanced.

BRIEF DESCRIPTION OF THE DRAWINGS

Implementations are described by way of example only with reference to the attached figures.

DETAILED DESCRIPTION

A detailed description with the above drawings is made to further illustrate the present disclosure.

Figure 1:
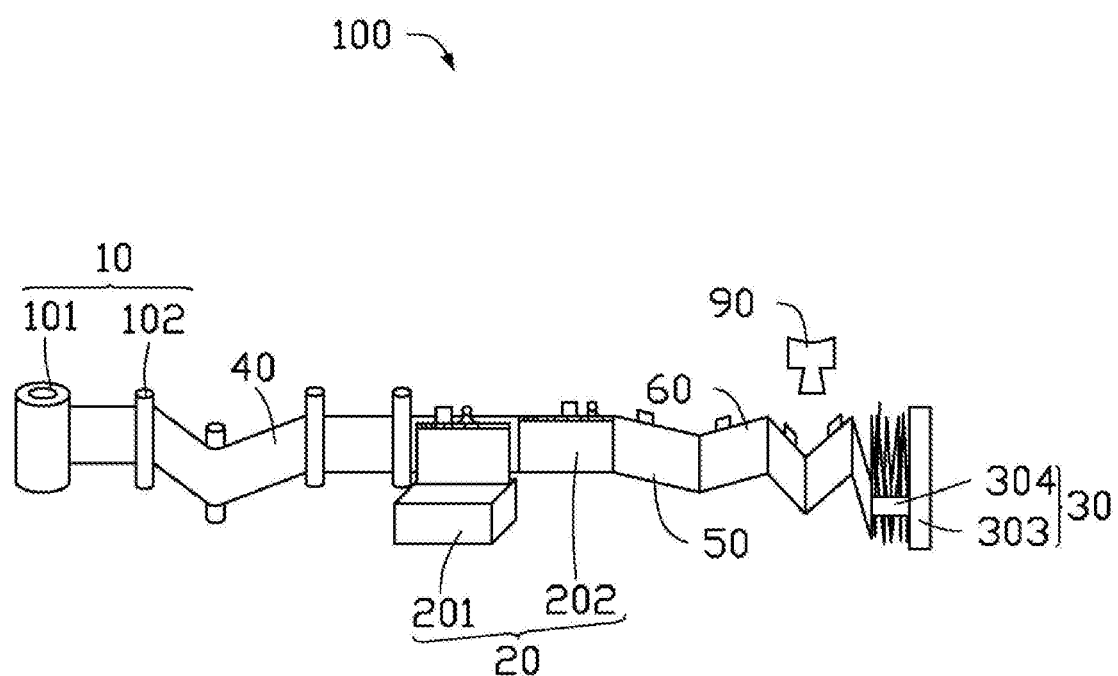
FIG. 1 is a schematic view of one embodiment of a lithium ion battery stacking device.

Referring to FIG. 1, one embodiment of a lithium ion battery stacking device 100 comprises a separator releasing mechanism 10, a stacking mechanism 20, and a collecting mechanism 30. The separator releasing mechanism 10 is configured to be loaded with a separator 40 and release the separator 40. The stacking mechanism 20 is configured to attach a cathode plate 50 and an anode plate 60 alternately on the separator. The collecting mechanism 30 is configured to fold and stack the separator 40 attached with the cathode plate 50 and the anode plate 60 to form the lithium ion battery.

The separator releasing mechanism 10 is configured to be loaded with the separator 40 and continuously release the separator 40. The separator releasing mechanism 10 can comprise a separator roller 101 and at least one transport roller 102. The separator 40 can be winded on the separator roller 101 and transported by the least one transport roller 102. An angle can be defined between a surface of the separator 40 and a horizontal plane. The at least one transport roller 102 can be perpendicular to the horizontal plane. The separator 40 can be attached to the transport roller 102 and bypass the transport roller 102. The surface of the separator 40 can be perpendicular to the horizontal plane, and can be kept perpendicular to the horizontal plane in the whole stacking process. In one embodiment, the separator releasing mechanism 10 can comprise four transport rollers 102. The four transport rollers 102 can be parallel to each other and parallel to the separator roller 101. A plurality of transport rollers 102 can be arranged according to a "Z"-shape. The separator 40 can successively bypass the plurality of transport rollers 102 one by one to decrease the stretching force of the separator 40, by which the separator 40 can be transported stably.

The stacking mechanism 20 can be spaced from the separator releasing mechanism 10 to position the separator 40, so that the cathode plate 50 or the anode plate 60 can be accurately attached on the surface of the separator 40, and an offset between the cathode plate 50 and the separator 40, or the anode plate 60 and the separator 40 can be avoided in the attaching process. The stacking mechanism 20 can comprises a positioning platform 201. The positioning platform 201 can comprise a plurality of positioning sensors (not shown) to position the cathode plate 50 to the separator 40, and the anode plate 60 to the separator 40. The positioning platform 201 can move up and down. A movement precision of the positioning platform 201 can be in a range from about 10 μm to about 100 μm to position the cathode plate 50 and the anode plate 60 accurately.

Figure 2:
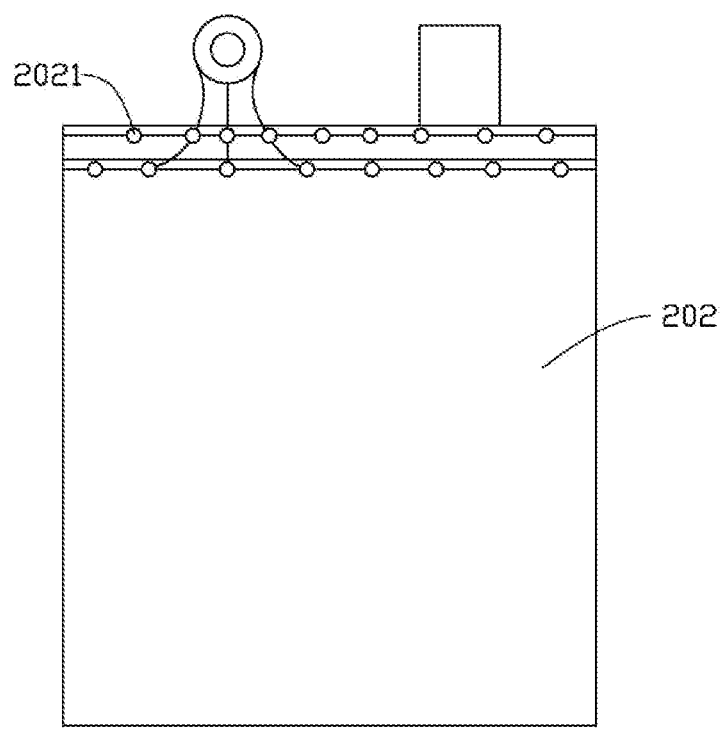
FIG. 2 is a schematic view of one embodiment of a double-face clamp of the lithium ion battery stacking device.

Referring to FIG. 2, the stacking mechanism 20 can comprise a plurality of double-face clamps 202 to clamp the cathode plate 50 and the separator 40, and clamp the anode plate 60 and the separator 40 to fix a relative position between the cathode plate 50 and the separator 40, or between the anode plate 60 and the separator 40. The plurality of double-face clamps 202 can be driven by a mechanism such as a sliding rail to move along a transport direction of the separator 40, thereby driving the cathode plate 50 with the separator 40, or the anode plate 60 with the separator 40 to move, and preventing the cathode plate 50 and the anode plated 60 from falling off from an attaching position on the surface of the separator 40 due to gravity.

The double-face clamp 202 can have two sheet structures opposite to each other. The two sheet structures can be opened and closed to clamp the cathode plate 50 and the anode plate 60. The lengths of a side that have a lug of the cathode plate 50 and the anode plate 60 can be respectively defined as the widths of the cathode plate 50 and the anode plate 60. The maximum length that the double-face clamp 202 can clamp the separator 40 can also be a clamping width of the double-face clamp 202 along the transport direction of the separator 40. The width of the double-face clamp 202 can be larger than or equal to the widths of the cathode plate 50 and the anode plate 60 to fix the cathode plate 50 and the anode plate 60 more firmly, preventing a misalignment between the cathode plate 50 and the separator 40, and between the anode plate 60 and the separator 40.

Two opposite inner surfaces of the double-face clamp 202 can be provided with a plurality of bulges 2021 to be in contact with the cathode plate 50, the anode plate 60, and the separator 40. The double-face clamp 202 can rotate with the cathode plate 50 and the anode plate 60, and transport the cathode plate 50 and the anode plate 60 to the collecting mechanism 30. The plurality of bulges 2021 can be uniformly arranged along a width direction of the double-face clamp 202. The plurality of bulges 2021 can be made of a flexible material to form a plastic/pliant surface, to fix the electrode plates firmly. A plurality of micropores can be defined on a surface touching the electrode plates and the separator 40 of each bulge 2021 to attach the electrode plates and the separator 40 more firmly. In one embodiment, a material of the plurality of bulges 2021 is smooth silicon rubber.

Figure 3:
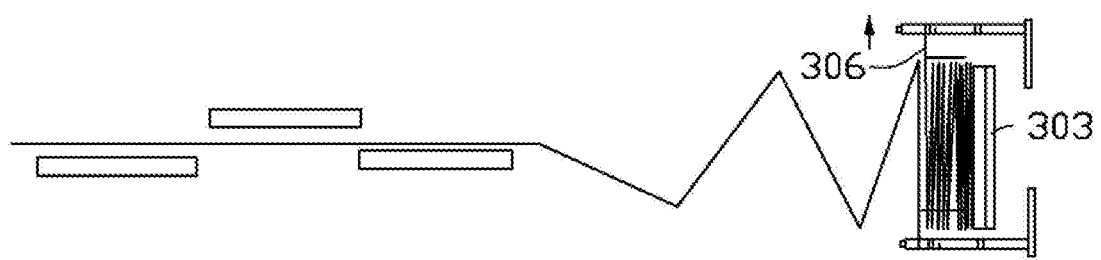
FIG. 3 is a schematic view of one embodiment of a collecting mechanism of the lithium ion battery stacking device.

Referring to FIG. 3, the collecting mechanism 30 can be disposed along the transport direction of the separator 40, and spaced from the stacking mechanism 20. The collecting mechanism 30 can comprise a stacking platform 303, a first pressing claw 304, and a second pressing claw 306. The stacking platform 303 can have a stacking surface to support the stacked cathode plate 50, anode plate 60, and the separator 40. The stacking surface of the stacking platform 303 can be a vertical plane. The stacking surface can be perpendicular to the surface of the separator 40.

The first pressing claw 304 and the second pressing claw 306 can be opposite to and spaced from each other, and disposed at two ends of the stacking platform 303 to alternately collect the cathode plate 50 and the anode plate 60 attached on the surfaces of the separator 40, and press the cathode plate 50 and the anode plate 60 onto the stacking surface. The first pressing claw 304 and the second pressing claw 306 can move toward or far away from each other by an air cylinder and a threaded rod. A distance between the first pressing claw 304 and the second pressing claw 306 can be selected according to the widths of the cathode plate 50 and the anode plate 50, as long as the first pressing claw 304 and the second pressing claw 306 can grab the cathode plate 50 and the anode plate 50 to put the cathode plate 50 and the anode plate 50 onto the stacking platform 303. The first pressing claw 304 can be configured to press the cathode plate 50. The second pressing claw 305 can be configured to press the anode plate 60.

Because the separator 40 attached with the cathode plate 50 and the anode plate 60 is alternately folded at a position near the stacking surface, the first pressing claw 304 and the second pressing claw 306 can be symmetrically disposed at two ends of the stacking surface near two sides that is formed by folding the separator 40 to press the sides.

Figure 4:
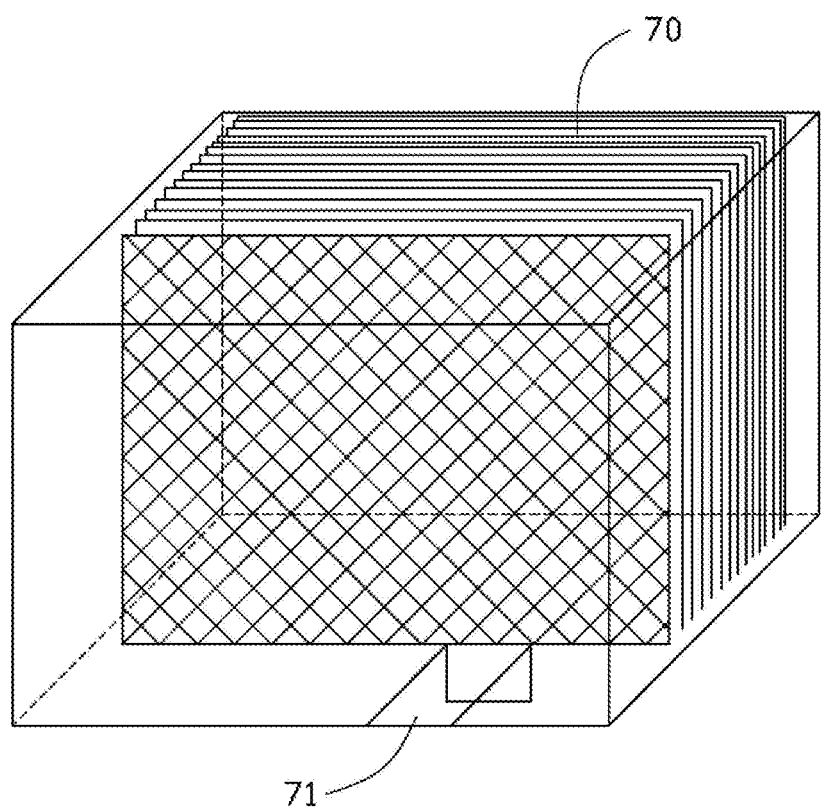
FIG. 4 is a schematic view of one embodiment of an electrode plate box of the lithium ion battery stacking device.
Figure 5:
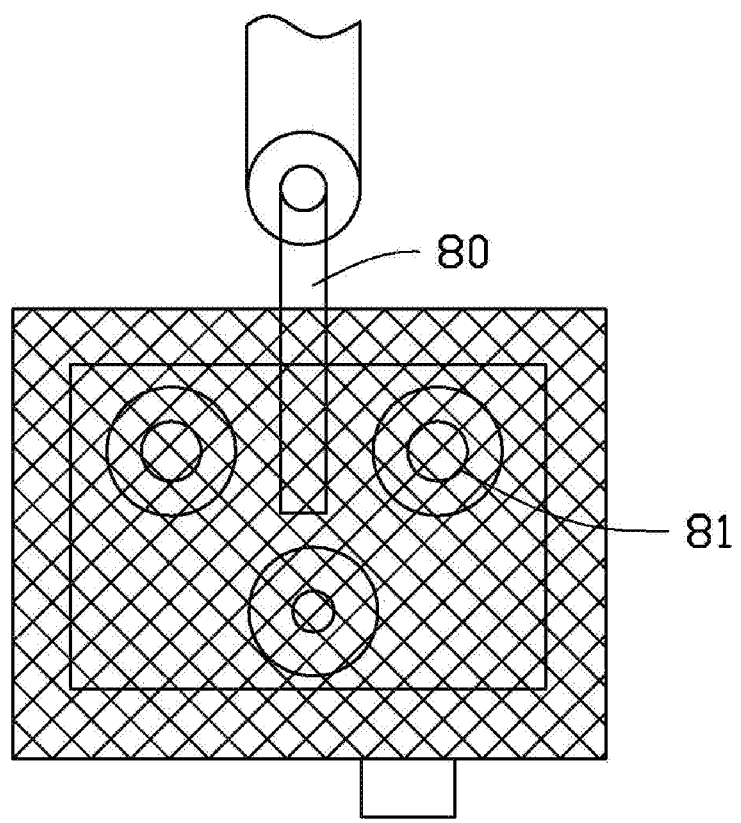
FIG. 5 is a schematic view of one embodiment of a rotatable manipulator hand of the lithium ion battery stacking device.

Referring to FIG. 4 and FIG. 5, the cathode plate 50 and the anode plate 60 can be respectively stored in an electrode plate box 70 before stacked with the separator 40. The electrode plate box 70 can define a lug channel 71 to accommodate lugs of the cathode plate 50 and the anode plate 60. The lugs of the cathode plate 50 and the anode plate 60 can slide in the lug channel 71. Two electrode plate boxes 70 that are respectively used to store the cathode plate 50 and the anode plate 60 can be spaced from each other. The two electrode plate boxes 70 can be respectively disposed on two sides of two opposite surfaces of the separator 40 to avoid micro-short circuiting. A rotatable manipulator hand 80 can suck and transport the cathode plate 50 and the anode plate 60 to the surfaces of the separator 40. The rotatable manipulator hand 80 can comprises a plurality of sucking discs 81 to suck and transport the cathode plate 50 and the anode plate 60, and transport them to the surfaces of the separator 40. The plurality of sucking discs 81 can be distributed in a triangle to suck the surfaces of the cathode plate 50 and the anode plate 60 more firmly.

The stacking device can further comprise a duster 90 to remove dust from the surfaces of the cathode plate 50 and the anode plate 60, and eliminate static electricity between the cathode plate 50 and the separator 40, and between the anode plate 60 and the separator 40. The duster 90 can blow air vertically, that is, a direction of airflow is parallel to the surface of the separator 40 and perpendicular to the horizontal plane, thereby greatly enhancing the dedusting effect. The duster 90 can be disposed between the stacking mechanism 20 and the collecting mechanism 30 to remove dust effectively. In one embodiment, the duster 90 is an ionized blower.

Figure 6:
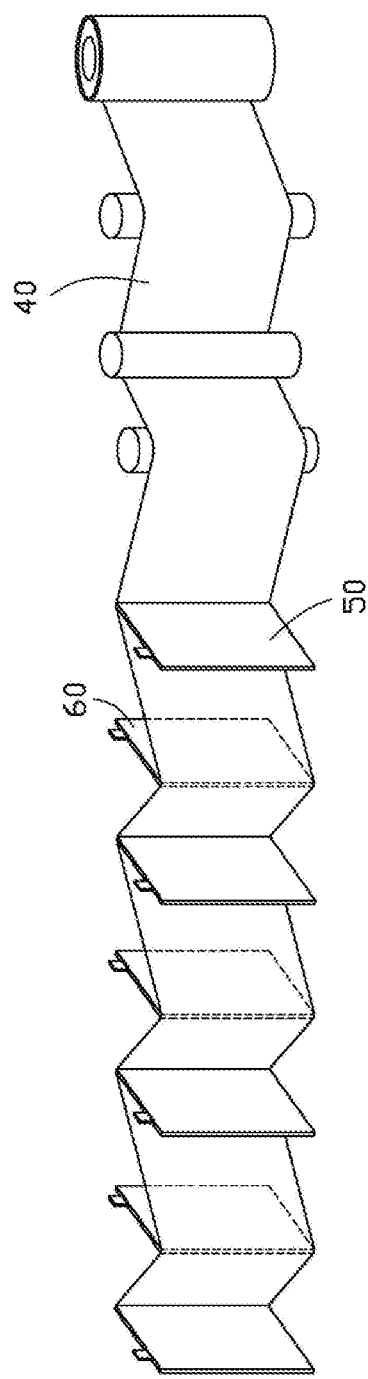
FIG. 6 is schematic view showing a stacking process of the lithium ion battery stacking device.

Referring to FIG. 6, when using the lithium ion battery stacking device 100 to stack plates, automatic plate providing and positioning, separator and electrode plates positioning, and stacking platform positioning can be set. The electrode plates can be stacked in a Z-shape compression manner. After the electrode plates (cathode plates and anode plates) are put into the electrode plate boxes, the rotatable manipulator hand sucks the electrode plates by the sucking disc and rotates to transport the electrode plates to the separator. A plurality of manipulator hands such as three manipulator hands can transport the electrode plates simultaneously. The cathode plates and the anode plates can be disposed in a stagger way and disposed according to a process data. The electrode plates and the separator are clamped by the plurality of double-face clamps to prevent the electrode plates from falling off from the attaching position on the separator due to gravity. In the stacking process, the plurality of double-face clamps connected to an automated electronic device can move along a "Z"-shaped path. When the electrode plates get close to the stacking platform, the first pressing claw and the second pressing claw is moved to press the separator attaching the electrode plates onto the stacking platform. Furthermore, the ionized blower blows air to the electrode plates and the separator to prevent static electricity and dust from staying between the electrode plates and the separator to improve dust removal effect under the action of gravity.

In the present disclosure, the stacking direction is changed, and the electrode plates and the separator are stacked in a direction perpendicular to the horizontal plane. By disposing the positioning platform, stacking the electrode plates and the separator in vertical direction and in a "Z"-shaped curve manner, providing the electrode plates in vertical manner, and using the double-face clamp circularly, the dust adsorbed on the surfaces of the electrode plates are easily removed, the work efficiency is increased, and product quality is enhanced. By clamping the electrode plates on the separator using double-face clamps on which smooth silicone rubber is disposed to touch the electrode plates, damage of the electrode plates due to non-uniform surface is avoided, and the electrode plates are accurately positioned. By setting the movement of the double-face clamp by an operational procedure, selecting route by a rotating device, and driving the double-face clamps clamping the cathode plates and the anode plates to move in different directions, the electrode plates and the separator is stacked circularly and work efficiency is improved. The stacking precision and the stacking speed are increased. The micro-short circuiting caused by dust is decreased. By disposing the ionized blower between the stacking mechanism and the collecting mechanism to blow air vertically, the dust is removed from the surfaces of the cathode plate, the anode plate, and the separator, and the static electricity between the cathode plate and the separator, and between the anode plate and the separator is eliminated.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A lithium ion battery stacking device, comprising:
   a separator releasing mechanism to be loaded with a separator and release the separator;
   a stacking mechanism to attach a cathode plate and an anode plate to the separator; and
   a collecting mechanism to stack the separator attached with the cathode plate and the anode plate,
   wherein the separator releasing mechanism, the stacking mechanism, and the collecting mechanism are configured to keep the separator perpendicular to a horizontal plane, the stacking mechanism comprises a plurality of double-face clamps to clamp the cathode plate and the anode plate on the separator, two opposite inner surfaces of each double-face clamp are provided with a plurality of bulges to be in contact with the cathode plate and the anode plate.

2. The lithium ion battery stacking device of claim 1, wherein each double-face clamp has two sheet structures opposite to each other, the two sheet structures are capable of being opened and closed to clamp the cathode plate and the anode plate on the separator.

3. The lithium ion battery stacking device of claim 1, wherein a width of the double-face clamp is larger than or equal to a width of either the cathode plate or the anode plate.

4. The lithium ion battery stacking device of claim 1, wherein the plurality of bulges are made of a flexible material to form a plastic surface, and a plurality of micropores are defined on a surface of each bulge.

5. The lithium ion battery stacking device of claim 1, wherein the plurality of double-face clamps is configured to rotate and fold the separator attached with the cathode plate and the anode plate near the collecting mechanism.

6. The lithium ion battery stacking device of claim 1, wherein the separator releasing mechanism comprises a separator roller and a plurality of transport rollers, the plurality of transport rollers is arranged according to a "Z"-shape, the separator is winded on the separator roller and transported by the plurality of transport rollers, and the separator roller and the plurality of transport rollers are perpendicular to the horizontal plane.

7. The lithium ion battery stacking device of claim 1, wherein the stacking mechanism comprises a positioning platform to position the cathode plate on the separator, and to position the anode plate on the separator, the positioning platform is movable, and a movement precision of the positioning platform is in a range from about 10 μm to about 100 μm.

8. The lithium ion battery stacking device of claim 1, wherein the collecting mechanism comprises a stacking platform, a first pressing claw, and a second pressing claw, the stacking platform has a stacking surface perpendicular to the horizontal plane, and the first pressing claw and the second pressing claw are opposite to and spaced from each other, and disposed at two ends of the stacking surface.

9. The lithium ion battery stacking device of claim 1, wherein the device further comprises two electrode plate boxes to respectively store the cathode plate and the anode plate, and further comprises a rotatable manipulator hand to suck the cathode plate and the anode plate from the two electrode plate boxes and transport the cathode plate and the anode plate to surfaces of the separator.

10. The lithium ion battery stacking device of claim 1, wherein the device further comprises a duster disposed between the attaching mechanism and the collecting mechanism to remove dust adsorbed on the cathode plate, the anode plate, and the separator and to eliminate static electricity between the cathode plate and the separator, and between the anode plate and the separator.

11. The lithium ion battery stacking device of claim 1, wherein the duster is an ionized blower to blow air in a vertical direction.

12. A lithium ion battery stacking device, comprising:
a separator releasing mechanism to be loaded with a separator and release the separator;
a stacking mechanism to attach a cathode plate and an anode plate to the separator; and
a collecting mechanism to stack the separator attached with the cathode plate and the anode plate,
wherein the separator releasing mechanism, the stacking mechanism, and the collecting mechanism are configured to keep the separator perpendicular to a horizontal plane, the stacking mechanism comprises a plurality of double-face clamps to clamp the cathode plate and the anode plate on the separator, each double-face clamp has two sheet structures opposite to each other, the two sheet structures are capable of being opened and closed to clamp the cathode plate and the anode plate on the separator, two opposite inner surfaces of each double-face clamp are provided with a plurality of bulges to be in contact with the cathode plate, the anode plate, and the separator, the plurality of bulges are made of a flexible material to form a plastic surface, and a plurality of micropores are defined on a surface of each bulge.

* * * * *